United States Patent
O'Shea et al.

(10) Patent No.: US 8,103,718 B2
(45) Date of Patent: Jan. 24, 2012

(54) CONTENT DISCOVERY AND TRANSFER BETWEEN MOBILE COMMUNICATIONS NODES

(75) Inventors: Gregory Francis O'Shea, Cambridge (GB); Thomas Christian Zahn, Cambridge (GB); Antony Rowstron, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 12/183,460

(22) Filed: Jul. 31, 2008

(65) Prior Publication Data
US 2010/0030840 A1 Feb. 4, 2010

(51) Int. Cl.
*G06F 15/16* (2006.01)
(52) U.S. Cl. ........ 709/203; 709/201; 709/224; 709/226; 707/203
(58) Field of Classification Search .................. 709/203, 709/224, 228, 220, 226; 707/203
See application file for complete search history.

(56) References Cited

U.S. PATENT DOCUMENTS

| | | | | |
|---|---|---|---|---|
| 5,924,094 | A * | 7/1999 | Sutter | 1/1 |
| 6,505,200 | B1 * | 1/2003 | Ims et al. | 707/638 |
| 6,681,370 | B2 * | 1/2004 | Gounares et al. | 715/238 |
| 6,920,477 | B2 * | 7/2005 | Mitzenmacher | 709/203 |
| 7,162,502 | B2 * | 1/2007 | Suarez et al. | 1/1 |
| 7,249,156 | B2 | 7/2007 | Chae | |
| 7,254,608 | B2 | 8/2007 | Yeager et al. | |
| 7,320,011 | B2 * | 1/2008 | Koskimies | 1/1 |
| 7,363,384 | B2 | 4/2008 | Chatani et al. | |
| 7,483,925 | B2 * | 1/2009 | Koskimies et al. | 1/1 |
| 7,710,984 | B2 * | 5/2010 | Dunk | 370/400 |
| 2001/0048728 | A1 | 12/2001 | Peng | |
| 2003/0233383 | A1 * | 12/2003 | Koskimies | 707/204 |
| 2004/0044774 | A1 | 3/2004 | Mangalik et al. | |
| 2004/0087326 | A1 | 5/2004 | Dunko et al. | |
| 2004/0172423 | A1 | 9/2004 | Kaasten et al. | |
| 2005/0047426 | A1 | 3/2005 | Aaltonen et al. | |
| 2005/0091658 | A1 | 4/2005 | Kavalam et al. | |
| 2005/0108368 | A1 | 5/2005 | Mohan et al. | |
| 2005/0160045 | A1 * | 7/2005 | Watanabe et al. | 705/51 |
| 2005/0266835 | A1 | 12/2005 | Agrawal et al. | |
| 2005/0275566 | A1 | 12/2005 | Lahtiranta et al. | |
| 2005/0289265 | A1 | 12/2005 | Illowsky et al. | |
| 2006/0045115 | A1 | 3/2006 | Nix et al. | |
| 2006/0080032 | A1 | 4/2006 | Cooper et al. | |

(Continued)

OTHER PUBLICATIONS

Ahlswede, et al., "Network Information Flow", retrieved on May 13, 2008 at <<http://www.cs.cornell.edu/courses/cs783/2007fa/papers/acly.pdf>>, IEEE Transactions on Information Theory (0018-9448/00), vol. 46, No. 4, 2000, pp. 1204-1216. Ahmed, et al., "VANETCODE: Network Coding to Enhance Cooperative Downloading in Vehicular Ad-Hoc Networks", retrieved on May 13, 2008 at <<http://delivery.acm.org/10.1145/1150000/1143654/p527-ahmed.pdf?key1=1143654&key2=2510760121&coll=GUIDE&dl=GUIDE&CFID=27651506&CFTOKEN=41866410>>, ACM IWCMC 2006 (1-59593-306-9/06/0007), 2006, pp. 527-532.

(Continued)

*Primary Examiner* — Khanh Dinh
(74) *Attorney, Agent, or Firm* — Lee & Hayes, PLLC

(57) ABSTRACT

Content discovery and content transfer between mobile communications nodes is often required, for example, to synchronize maps, traffic hot spot information and the like for vehicle mounted satellite navigation devices, pedestrian hand-held personal digital assistants and other mobile communications nodes. In an embodiment, content discovery processes using data structures designed in particular ways and sent using a single packet enable nodes to identify files to be transferred whilst keeping overheads down. In an embodiment a first and a second data structure are used, each being formed from slightly different information about a subset of the files to be synchronized. In another embodiment a single tree-based data structure is used. A process for transferring data between two mobile communications nodes is also described.

20 Claims, 11 Drawing Sheets

U.S. PATENT DOCUMENTS

| | | | |
|---|---|---|---|
| 2006/0123010 A1 | 6/2006 | Landry et al. | |
| 2007/0296805 A1 | 12/2007 | Tedenvall et al. | |
| 2008/0002599 A1 | 1/2008 | Yau et al. | |
| 2008/0016160 A1 | 1/2008 | Walter et al. | |
| 2008/0104142 A1 | 5/2008 | Oh et al. | |
| 2009/0067551 A1 | 3/2009 | Chen et al. | |
| 2011/0070757 A1* | 3/2011 | Krampf et al. | 439/136 |
| 2011/0126084 A1 | 5/2011 | Serret-Avila | |

OTHER PUBLICATIONS

Bakre, et al., "I-TCP: Indirect TCP for Mobile Hosts", retrieved on May 13, 2008 at <<http://www.cs.ucsd.edu/~snoeren/cse291/papers/bb95.>>, IEEE Computer Society ICDCS, 1995, pp. 136-154.

Balakrishnan, et al., "Improving TCP/IP Performance over Wireless Networks", retrieved on May 13, 2008 at <<http://delivery.acm.org/10.1145/220000/215544/p2-balakrishnan.pdf?key1=215544&key2=0632560121&coll=GUIDE&dl=GUIDE&CFID=27612604&CFTOKEN=56828195>>, ACM MobiCom (0-89791-814-2/95/10), 1995, pp. 2-11.

Bloom, et al., "Space/Time Trade-Offs in Hash Coding with Allowable Errors", retrieved on May 13, 2008 at <<http://delivery.acm.org/10.1145/370000/362692/p422-bloom.pdf?key1=362692&key2=1372560121&coll=GUIDE&dl=GUIDE&CFID=27613094&CFTOKEN=79796450>>, Communications of the ACM, vol. 13, No. 7, 1970, pp. 422-426.

Bychkovsky, et al., "A Measurement Study of Vehicular Internet Access Using In Situ Wi-Fi Networks", retrieved on May 13, 2008 at <<http://delivery.acm.org/10.1145/1170000/1161097/p50-bychkovsky.pdf?key1=1161097&key2=8982560121&coll=GUIDE&dl=GUIDE&CFID=27613318&CFTOKEN=30721974>>, ACM MOBICOM (1-59593-286-0/06/0009), 2006, pp. 50-61.

Byers, et al., "A Digital Fountain Approach to Reliable Distribution of Bulk Data", retrieved on May 13, 2008 at <<http://delivery.acm.org/10.1145/290000/285258/p56-byers.pdf?key1=285258&key2=3413560121&coll=GUIDE&dl=GUIDE&CFID=67782843&CFTOKEN=10907864>>, ACM SIGCOMM (1-58113-003-1/98/0008), 1998, pp. 56-67.

Das, et al., "SPAWN: A Swarming Protocol for Vehicular Ad-Hoc Wireless Networks", retrieved on May 13, 2008 at <<http://coblitz.codeen.org:3125/citeseer.ist.psu.edu/cache/papers/cs2/715/http:zSzzSzwww.gpau.netzSzpaperszSzVenet04.pdf/das04spawn.pdf>>, ACM VANET 2004 (1-58113-922-5/04/0010), 2004, pp. 93-94.

Gass, et al., "Measurements of In-Motion 802.11 Networking", retrieved on May 13, 2008 at <<http://ieeexplore.ieee.org/iel5/11140/35655/01691716.pdf?tp=&isnumber=&arnumber=1691716>>, IEEE WMCSA 2006 (0-7695-2439-7/06), 2006, pp. 1-6.

Gkantsidis, et al., "Network Coding for Large Scale Content Distribution", retrieved on May 13, 2008 at <<http://ieeexplore.ieee.org/iel5/9990/32102/01498511.pdf?tp=&isnumber=&arnumber=1498511>>, IEEE INFOCOM (0-7803-8968-9/05), 2005, pp. 2235-2245.

Hadaller, et al., "Vehicular Opportunistic Communication under the Microscope", retrieved on May 13, 2008 at <<http://delivery.acm.org/10.1145/1250000/1247685/p206-hadaller.pdf?key1=1247685&key2=9034560121&coll=GUIDE&dl=GUIDE&CFID=67784968&CFTOKEN=52288046>>, ACM MobiSys (978-1-59593-614-1/07/0006), 2007, pp. 206-219.

IEEE 802.11 working group, "Wireless LAN Medium Access Control (MAC) and Physical Layer (PHY) Specifications", retrieved on May 13, 2008 at <<http://www.csse.uwa.edu.au/adhocnets/802.11-1999.pdf>>, ANSI/IEEE Std 802.11, 1999, pp. 1-528.

Klemm, et al., "A Special-Purpose Peer-to-Peer File Sharing System for Mobile Ad Hoc Networks", retrieved on May 13, 2008 at <<http://ieeexplore.ieee.org/iel5/9004/28571/01286080.pdf?tp=&isnumber=&arnumber=1286080>>, IEEE VTC 2003 (0-7803-7954-3/03), vol. 4, 2003, pp. 2758-2763.

Lee, et al., "CodeTorrent: Content Distribution using Network Coding in VANET", retrieved on May 13, 2008 at <<http://netlab.cs.ucla.edu/wiki/files/codetorrent_mobishare06.pdf>>, ACM MobiShare 2006 (1-59593-558-4/06/09), 2006, pp. 1-6.

Lee, et al., "First Experience with Cartorrent in a Real Vehicular Ad Hoc Network Testbed", retrieved on May 13, 2008 at <<http://ieeexplore.ieee.org/iel5/4300797/4300798/04300814.pdf?tp=&isnumber=&arnumber=4300814>>, IEEE MOVE'07 (978-1-4244-1690-5/07), 2007, pp. 109-114.

Lehtinen, "Secure and Mobile P2P File Sharing", retrieved on Jul. 25, 2008 at <<http://www.tml.tkk.fi/Publications/C/21/Lehtinen_ready.pdf>>, Helsinki University of Technology (Telecommunications Software and Multimedia Laboratory, T-110.51-90 Seminar), 2006, pp. 1-7.

Mahajan, et al., "Understanding Wifi-Based Connectivity from Moving Vehicle", retrieved on May 13, 2008 at <<http://delivery.acm.org/10.1145/1300000/1298351/p321-mahajan.pdf?key1=1298351&key2=8935560121&coll=GUIDE&dl=&CFID=4275787&CFTOKEN=30402676>>, ACM IMC 2007 (978-1-59593-908-1/07/0010), 2007, pp. 321-326.

Merkle, "A Digital Signature Based on a Conventional Encryption Function", retrieved on May 13, 2008 at <<http://dsns.csie.nctu.edu.tw/research/crypto/HTML/PDF/C87/369.PDF>>, Springer-Verlag Crypto 1987, 1987, pp. 369-378.

Minsky, et al., "Set Reconciliation with Nearly Optimal Communication Complexity", IEEE Transactions on Information Theory, vol. 49, No. 9, 2003, pp. 2213-2218.

Mitzenmacher, "Compressed Bloom Filters", retrieved on May 13, 2008 at <<http://delivery.acm.org/10.1145/390000/384004/p144-mitzenmacher.pdf?key1=384004&key2=7275560121&coll=GUIDE&dl=GUIDE&CFID=27617480&CFTOKEN=76494443>>, IEEE/ACM Transactions on Networking, vol. 10, No. 5, 2002, pp. 604-612.

Nandan, et al., "Co-operative Downloading in Vehicular Ad-hoc Wireless Networks", retrieved on May 13, 2008 at <<http://www.cs.ucla.edu/NRL/OverProbe/papers/spawn_wons_2005.pdf>>, IEEE WONS, 2005, pp. 1-10.

Ott, et al., "A Disconnection-Tolerant Transport for Drive-Thru Internet Environments", retrieved on May 13, 2008 at <<http://ieeexplore.ieee.org/iel5/9990/32101/01498464.pdf?tp=&isnumber=&arnumber=1498464>>, IEEE INFOCOM (0-7803-8968-9/05), vol. 3, 2005, pp. 1849-1862.

Ott, et al., "Drive-Thru Internet: IEEE 802.11b for "Automobile" Users", retrieved on May 13, 2008 at <<http://ieeexplore.ieee.org/iel5/9369/29751/01354509.pdf?tp=&isnumber=&arnumber=1354509>>, IEEE IFOCOM (0-7803-8355-9/04), vol. 1, No. 7, 2004, pp. 362-373.

Pau, "Car-Torrent: A Swarming Protocol for Car-to-Car Networks", retrieved on May 14, 2008 at <<http://www.cse.ust.hk/pg/seminars/S05/pau.html>>, Seminar S05 (Hong Kong University of Science and Technology, CSE), 2005, pp. 1-2.

Yang, et al., "A Peer-to-Peer File Resource Sharing System for Mobile Devices", retrieved on Jul. 25, 2008 at <<http://ieeexplore.ieee.org/iel5/4539298/4539299/04539360.pdf?isnumber=4539299&prod=CNF&arnumber=4539360&arSt=275&ared=280&arAuthor=Yang%2C+Chao-Tung%3B+Chen%2C+Chun-Jen%3B+Chen%2C+Hung-Yen%3B+Hsu%2C+Ching-Hsien>>, IEEE GPC.WORKSHOPS (978-0-7695-3177-9/08), 2008, pp. 275-280.

Zhang, et al., "Study of a Bus-Based Disruption Tolerant Network: Mobility Modeling and Impact on Routing", retrieved on May 13, 2008 at <<http://delivery.acm.org/10.1145/1290000/1287876/p195-zhang.pdf?key1=1287876&key2=2686560121&coll=GUIDE&dl=GUIDE&CFID=27619340&CFTOKEN=79726899>>, ACM Mobicom (978-1-59593-681-3/07/0009), 2007, pp. 195-206.

PCT International Search Report dated Feb. 26, 2010 from corresponding International Application No. PCT/US2009/051176 filed Jul. 26, 2009, 4 pages.

Non-Final Office Action for U.S. Appl. No. 12/183,607, mailed on Jun. 23, 2011, Gregory Francis O'Shea, "Content Transfer," 19 pages.

* cited by examiner

Actions at A

CONTENT DISCOVERY AND TRANSFER BETWEEN MOBILE COMMUNICATIONS NODES

BACKGROUND

Mobile communications nodes such as satellite navigation devices, or Personal Navigation Devices, in vehicles, personal digital assistants carried by pedestrians and mobile telephones carried by human users who are traveling typically need to store content. For example, in the case of satellite navigation devices the content may be maps, road construction locations, safety camera locations, locations of points of interest, locations of landmarks and similar information. Depending on the type of mobile communication node and the applications involved the particular content will vary.

Typically, the content needed by such mobile communications nodes needs to be updated and distributed to the nodes themselves. One option is to arrange the mobile communications nodes to download the content from network infrastructure each time it is required rather than storing the content locally at the mobile communications node. However, such on-demand systems incur high communication costs.

Another option is to store content locally at a mobile communications device. This is practical where the mobile device has sufficient memory resources. However, there is a need to continually update the information to keep it fresh and also a need to disseminate new content to many such mobile communications devices in a simple, reliable, fast and cost effective manner which is user-friendly.

Satellite navigation devices for use in motor vehicles are known which provide BlueTooth (trade mark) connectivity to enable the device to connect to a mobile telephone also in the vehicle. In this way the satellite navigation device is able to fetch content from an Internet data center by connecting to the Internet using the data services of the cellular network of the mobile telephone. However, this approach relies on the cellular telephone network for content distribution. Different organizations control access to the cellular network infrastructure so that negotiation with those different organizations is required for access. In addition, different cellular technologies are used in different regions so that hardware customization of the mobile device may be required for use in those different regions. Different charging plans are also likely to be in place in the different geographical regions of the network so that end users may easily find they have inadvertently run up larger bills than expected.

Satellite navigation devices for use in motor vehicles are also known which receive content broadcast from network infrastructure via FM radio channels or Satellite based distribution. This approach works in geographical regions where coverage is available, although such coverage is typically limited. FM-based solutions provide low bit rates and are limited to cities and areas where licenses can be obtained and the infrastructure installed. Satellite based solutions can support much higher bit-rates but require costly infrastructure investment.

The embodiments described below are not limited to implementations which solve any or all of the disadvantages of known content discovery and transfer processes between mobile communications nodes.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Content discovery and content transfer between mobile communications nodes is often required, for example, to synchronize maps, traffic hot spot information and the like for vehicle mounted satellite navigation devices, pedestrian hand-held personal digital assistants and other mobile communications nodes. In an embodiment, content discovery processes using data structures designed in particular ways and sent using a single packet enable nodes to identify files to be transferred whilst keeping overheads down. In an embodiment a first and a second data structure are used, each being formed from slightly different information about a subset of the files to be synchronized. In another embodiment a single tree-based data structure is used. A process for transferring data between two mobile communications nodes is also described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
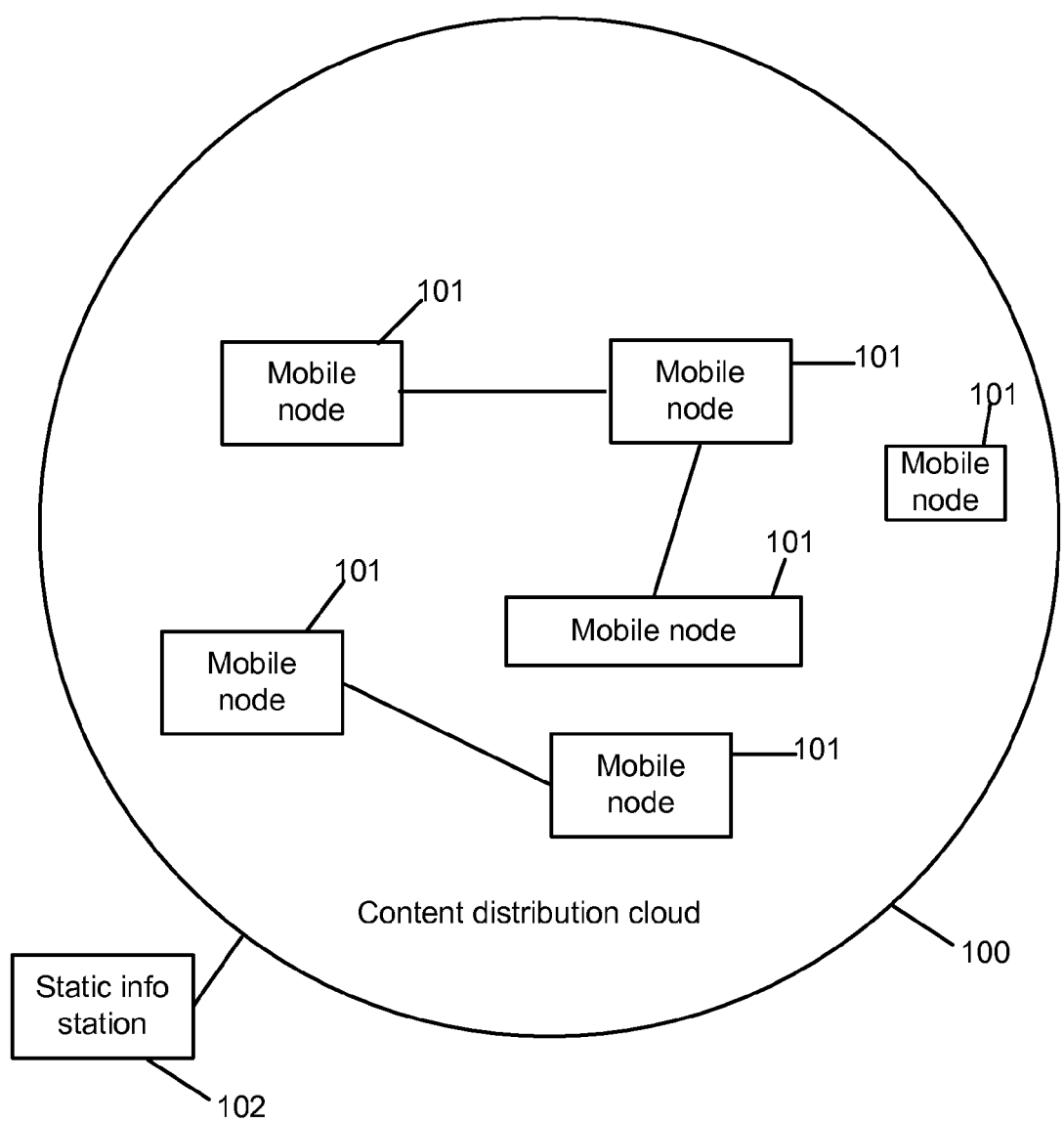
FIG. 1 is a schematic diagram of a communications network.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a vehicular network consisting of satellite navigation devices mounted in vehicles, the system described is provided as an example and not a limitation. As those skilled in the art will appreciate, the present examples are suitable for application in a variety of different types of communications networks having mobile communications network nodes.

The term "packet" is used to refer to a message data structure having a header and a payload. The header is arranged to hold control information such as address details. The payload is arranged to hold one or more blocks of content. Each block is part of a piece of content such as a file or other item of information. Each block has a sequence identifier indicating an order in which the blocks are to be arranged to form the piece of content.

As mentioned above content is often stored locally at a mobile communications device. However, there is a need to continually update the information to keep it fresh and also a need to disseminate new content to many such mobile communications devices in a simple, reliable, fast and cost effective manner which is user-friendly. The content may be any type of information and may include images, lists, maps, numerical information, textual information, and also including control information such as operating system updates or other instructions for controlling the mobile communications node itself or any software applications provided on the mobile communications node. Content may be stored as files or as any other form of information.

The methods described herein are suitable for use in a peer-to-peer or epidemic content distribution system whereby mobile communications nodes are able to transfer content to one another directly (that is, without the need to send the content via a static network infrastructure node such as a base station). Many existing peer-to-peer content distribution systems are designed for use with fixed communications nodes and are unsuitable or inefficient for use where the communications nodes move. Often connection periods are short lived, on the order of a few seconds, when communications nodes are moving. For example, where the nodes are integral with satellite navigation devices mounted in motor vehicles or other vehicles or carried by pedestrians. As well as being short lived the connection quality is typically poor and existing peer-to-peer content distribution systems are not designed with this in mind. Another factor is that mobile communications nodes usually have limited processing resources as compared with fixed network infrastructure. This is another feature that existing peer-to-peer content distribution protocols have not typically considered.

FIG. 1 is a schematic diagram of a plurality of mobile communications network nodes 101 which are members of a content distribution cloud 100. Each mobile node 101 may be any suitable device which is able to communicate with one or more of the other mobile nodes 101 using a wireless interface. That is, the mobile nodes may be different from one another and comprise different hardware and software applications provided that they are able to communicate with one another using any suitable wireless interface. The wireless interface may be a short-range wireless interface such as WiFi as defined by the IEEE 802.11 standards or any other suitable wireless interface. For example, Bluetooth (trade mark), IEEE 802.15.4/Zigbee may also be used. Each mobile node 101 has a memory for storing content distributed from one or more of the other mobile nodes. A static info station 102 may optionally be provided. This is a static or fixed communications network node which has functionality to communicate with the mobile nodes 101 using the wireless interface. All of the mobile nodes 101 and any static info station nodes 102 are provided with suitable communications protocol software to implement the methods described herein.

The static info station 102 may be used to seed content into the content distribution cloud 100. The static info station may have access to all or only a subset of the content to be distributed through the cloud. When a mobile node 101 and a static info station 102 come into range, the mobile node is arranged to synchronize with the info station 102. For example, the static info station may be part of a home network. In that case, the mobile communications node 101 may be a PDA for example, and each time a user returns to his or her home, the PDA may be arranged to synchronize content with the static info station in the home network. Alternatively, the static info station may be provided in a communal car park to enable vehicle mounted mobile nodes to synchronize content with that static info station during use of the car park.

In an example, it is required to distribute a set of files, f, representing content to be distributed. Each file has a cryptographically signed file certificate of any suitable type. For example, the file certificate comprises an SHA1 hash of the file, a version number, a textual name for the file and an optional flag indicating a group of the file. A public key infrastructure (PKI) may be provided using an offline Certification Authority (CA) as known in the art. For example, each device may be provided with a public key for the CA. Each file may be associated with a single content provider, referred to as the file's owner, and, in general, only the owner is able to generate new versions of the file. When a file is updated a new certificate is required, with a new file hash and incremented version number. In general, version numbers are expected to be monotonically increasing, so, given two certificates for the same file, any device is able to determine which one is the newest.

Each file may have two file identifiers associated with it referred to herein as a file identifier and an instance identifier. The file identifier may be for example an SHA-1 hash of the textual filename concatenated with the public key of the content owner. The instance identifier is related to the file and version and may be an SHA-1 hash of the file certificate. Comparing the file identifiers allows nodes to determine the set of files they have in common, and comparing instance identifiers allows nodes to check if they have the same versions of files.

Each node has a set of files for content distribution and it is able to add or remove files from that set. Selection of files for the set may be as the result of user input or may be an automated process controlled in any suitable manner. This set of files may be considered as being stored in a dynamic cache on each node.

When two nodes 101, 102 meet, communication protocols at those nodes enable those nodes to synchronize, so that newer versions of specified files are transferred between the nodes, if available. The transferred content is verifiable using the file certificates and PKI infrastructure or in any other suitable manner.

As mentioned above there are particular challenges involved where the nodes are integral with satellite navigation devices mounted in motor vehicles or other vehicles or carried by pedestrians. Physical proximity between nodes is required in order to transfer content. At least two factors impact this, the fraction of vehicles that support the content distribution system and the popularity of the content required. Also, the value of a part transferred file is low, if a node is unlikely to encounter another node with the same file soon.

When two nodes 101 come into wireless communication range of one another they need to quickly and efficiently establish a connection and also to identify the one or more files that need transferring between the nodes 101. Any suitable method for establishing a connection between the nodes may be used such as the ad-hoc mode of the 802.11 protocol family. Each node is configured to broadcast a beacon message at regular intervals.

In a preferred embodiment the process of establishing a connection is based on the ad-hoc mode of the 802.11 protocol family as mentioned above. Every 100 ms, typically, one node within an 802.11 network beacons its current SSID and BSSID. When a node starts up it enters a quiet state and makes an active scan of a predefined list of channels to discover (SSID, BSSID) pairs for networks it could join. For an active scan the node transmits a probe request on each channel. When a node receives a probe request, if it believes that it was the last node to beacon, it responds with a probe response containing the SSID, BSSID pair. If the SSID used by the content distribution cloud is discovered then the node enters the joined state and this is signaled to the operating system that the node is connected.

A node remains in the joined state provided one or more beacons are received every specified number of seconds. For example, this may be every three seconds or every 1 second. If no beacons are received then the node scans using probe requests as described above. For example, the probe requests are sent every second and if no other node is discovered in 10 seconds the node enters the quite state and signals to the operating system that there is disconnection.

For mobile nodes the window of time for connectivity is very small as mentioned above. It is important to discover nodes rapidly to maximize this window. Various of the default timers and parameters of the ad-hoc mode 802.11 process may be modified to reduce the node discovery time. In addition, the ad-hoc mode process may be modified to ensure that active probing is carried out as described above, rather than passive scanning. For example, when a node transitions from a joined state to a quiet state active scanning may be performed frequently without any sleep process. Also, a node may remain in a joined state provided one or more beacons are received every 1 second with a media disconnect being triggered immediately that this fails to occur.

The ad-hoc mode of the 802.11 protocols incorporates beacon suppression processes which, it is recognized herein, may negatively impact the discovery time of nodes in communication range. Beacon suppression occurs when a node stops sending beacons as a result of overhearing another beacon for its current SSID. The methods described herein thus use an explicit advert process whereby each node in the content distribution cloud repeatedly broadcasts an advert announcing its presence. For example, the adverts are broadcast every k milliseconds where k is about 100 milliseconds or any other suitable value. In this way, after k milliseconds, all nodes in the content distribution cloud which are within communication range of one another, will have discovered each other.

As mentioned above, mobile nodes may only have a short window of opportunity, in the order of seconds, to exchange content. It is therefore desired to identify a file that needs transferring with as few communication round trips as possible. A round trip is the time required to send a message from a source node to a destination node and to receive a reply from the destination node source node. The process also needs to be robust because messages may easily be lost between mobile nodes due to the poor quality of connection between them. The term "source node" is used to refer to a node of a communications network which is arranged to transfer content stored at that node to another node in the communications network. The term "destination node" is used to refer to a node of a communications network which is arranged to accept content transferred from another node in the communications network. Individual nodes of a communications network may operate both as source and destination nodes.

A method at a source node in a communications network such as the content distribution cloud 100 of FIG. 1 is now described with reference to the block diagram of FIG. 2. This method comprises broadcasting adverts from the source node. Those adverts are received at a destination node in the communications network and may be used to identify a file that needs transferring with few round trips (as described below with reference to FIG. 3). In addition, the two nodes are able to efficiently determine which files they have in common and which node has the latest version (as described below with reference to FIG. 3). This type of process may be referred to as a content discovery process for dynamic content.

A source node accesses (block 200 FIG. 2) its dynamic cache at which files are stored for content distribution. Each file has a name, version and public key as mentioned above. For each file the source node generates two identifiers (block 201). A file identifier is generated for a file based on the file's name and public key. An instance identifier is generated for a file based on the file's name, public key and version. The source node also generates a global identifier as a function of the file and instance identifiers of each file (see block 202 of FIG. 2). That is, there is a single global identifier per dynamic cache. The source node embeds the global identifier as well as information about the total number of files in its dynamic cache into an advert message (block 203 of FIG. 2). The source node repeatedly broadcasts the advert (block 204) as described above.

Figure 2:
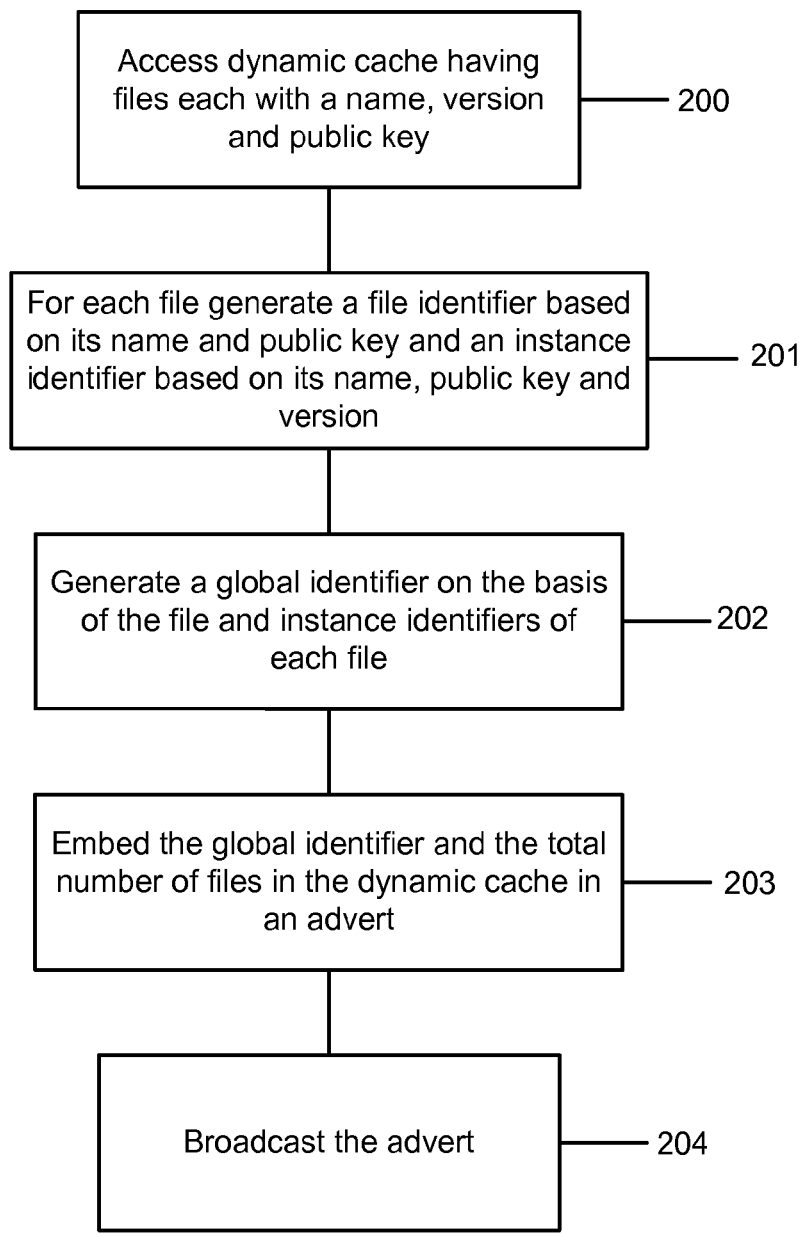
FIG. 2 is a block diagram of a method at a communications node.

A destination node receives (block 300 of FIG. 3) an advert such as that broadcast at block 204 of FIG. 2. The destination node optionally checks (block 301) whether it has less files than the advert sender in its dynamic cache. It uses the information in the received advert about the number of files at the source node dynamic cache to do this.

This optional check is made in order to reduce the number of messages required to complete the negotiation as to which files are held in common between the two nodes and which node has the latest version of each of those files. The node with the smallest number of files in its dynamic cache begins the process in order to reduce this number of messages. The process is workable without the check at block 301 being made and in that case, it is not necessary for the adverts to incorporate information about the number of files held in the dynamic cache of the appropriate node.

Figure 3:
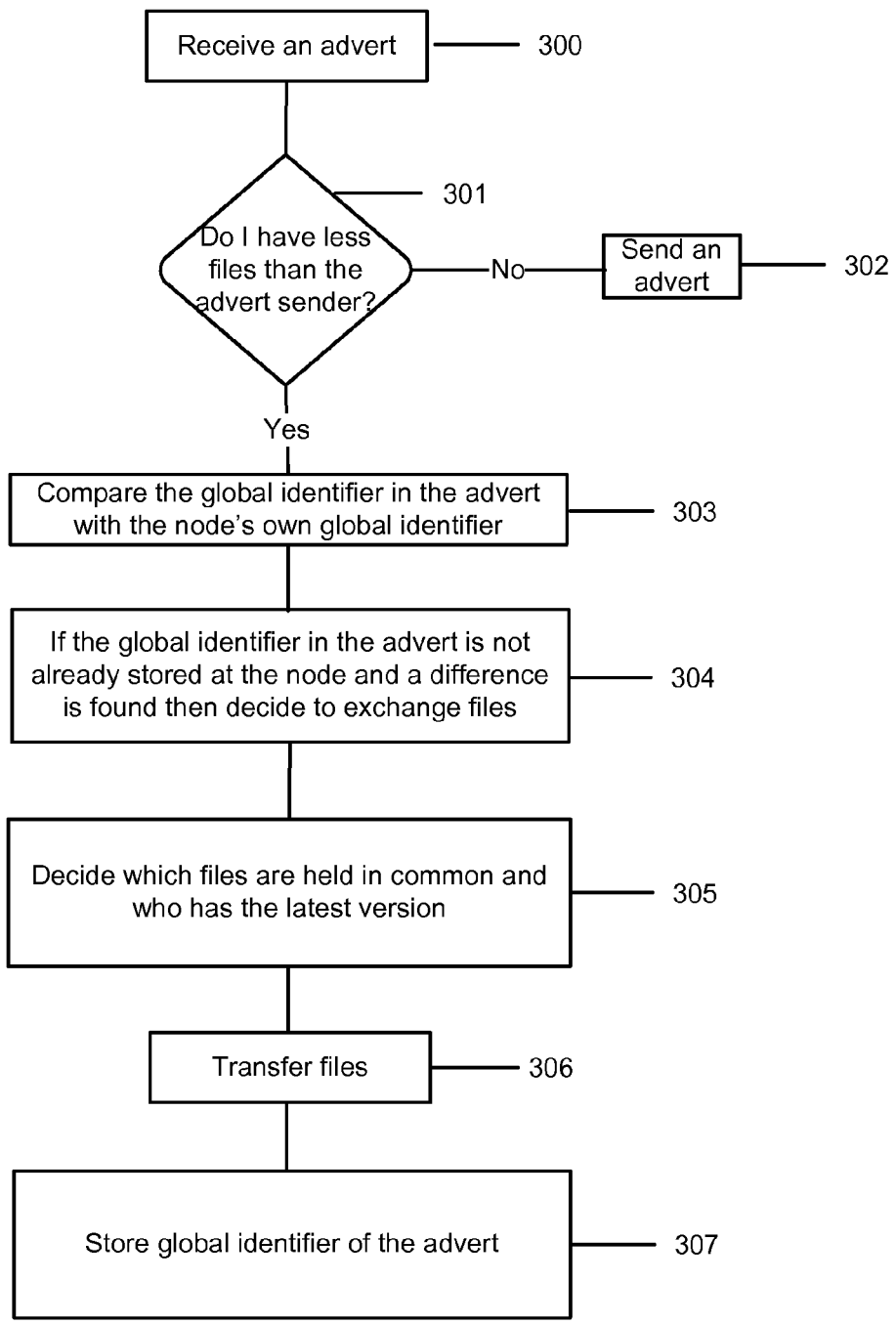
FIG. 3 is a block diagram of a method at another communications node.

If the destination node has fewer files in its dynamic cache than the source node, the destination node proceeds with the process as shown in FIG. 3. Otherwise the destination node continues to broadcast adverts (block 302).

In order to decide whether to exchange files with the source node, the destination node compares its global identifier with that in the received advert (block 303). If a difference is found then the source and destination nodes have different content files. Nodes are optionally arranged to store the address of the source node and the global identifier of any source node with which they have completely exchanged their dynamic cache content (block 304). This prevents the content discovery process from being undergone unnecessarily for nodes that have already been synchronized.

A process for deciding which dynamic cache files are held in common and which node has the latest version of these is next undergone (block 305). This process is described in more detail with reference to FIGS. 4 and 5. The identified files are transferred (block 306) using any suitable content transfer process, for example, TCP over IP or any other suitable packet-based content transfer process. After synchronization, the address of the source node and the global identifier in the received advert are optionally stored at the destination node (block 307).

Because the set of files in a dynamic cache of a node may be arbitrarily large and because the amount of data that can be transferred in a payload of a packet is limited, it is difficult to achieve the content discovery process in an efficient manner. In order to address this data structures are employed to transfer data about the files in the dynamic caches between the nodes and those data structures are designed in a particular manner to enable the content discovery process to be achieved simply and efficiently.

In a particular example, the data structures are based on Bloom filters. However, it is not essential to use Bloom filters. Any suitable data structure may be used which is able to encode file set membership in a manner such that the data structure may be used to determine if a particular file was a member of the set of encoded files without providing false negatives. Bloom filters are described in detail in B. Bloom, "Space/time trade-offs in hash coding with allowable errors." Communications of the ACM, 13(7):422-426, 1970.

A Bloom filter comprises a bit array of certain length, where, for each items of a given set, the $hash_j(item)^{th}$ bit is set, for all hash functions in a given set of j hash functions. In order to check whether an item is present in the set, each $hash_j(item)^{th}$ is checked, and if each bit is set then the bloom filter is considered to contain the item. Bloom filters cannot yield false negatives, but they can yield false positives. In general there is a trade off between the number of items that can be encoded in a Bloom filter of a given length and the probability of false positives.

In some embodiments full Bloom filters are used where the file identifiers of all files in a dynamic cache are encoded in the Bloom filter. However, in other embodiments partial Bloom filters are used in which only a subset of the file identifiers are encoded. For example, the first 1000 or the first 500 file identifiers.

In a particular embodiment a bloom filter with array length 18288 bits is provided which is arranged to be the same as the size of a packet payload. Using the heuristics presented by Mitzenmacher (M. Mitzenmacher. Compressed bloom filters. IEEE/ACM Transactions on Networking, 10(5), 2002) 1000 file identifiers are encoded per partial Bloom filter using 12 hash functions. This yields a false positive probability of 0.0154%. However, it is not essential to use these particular Bloom filter parameters.

A negotiation scheme to determine the appropriate files for transfer between two nodes A and B is now described with reference to FIGS. 4, 5 and 6. The processes of FIGS. 4 and 5 describe in more detail the process described at high level in block 305 of FIG. 3. Suppose that node B is the node with the fewer files in its dynamic cache (although this is not essential as mentioned above).

Node B receives an advert 602 from node A. The advert comprises a global identifier as mentioned above and optionally details about the number of files in A's dynamic cache. Using this information B is able to establish that it has fewer files in its dynamic cache and that at least one file needs transferring between A and B.

Node B generates and sends to node A a first data structure. This first data structure is formed from the file identifiers of a specified set of files at the dynamic cache (block 400 of FIG. 4). The specified set of files may be a subset of the files at the dynamic cache or may be all those files. The file identifiers are described above with reference to FIG. 2.

Node B also generates and sends to node A a second data structure. This second data structure is formed from the instance identifiers of the same files (block 401 of FIG. 4). The instance identifiers are described above with reference to FIG. 2.

Figure 6:
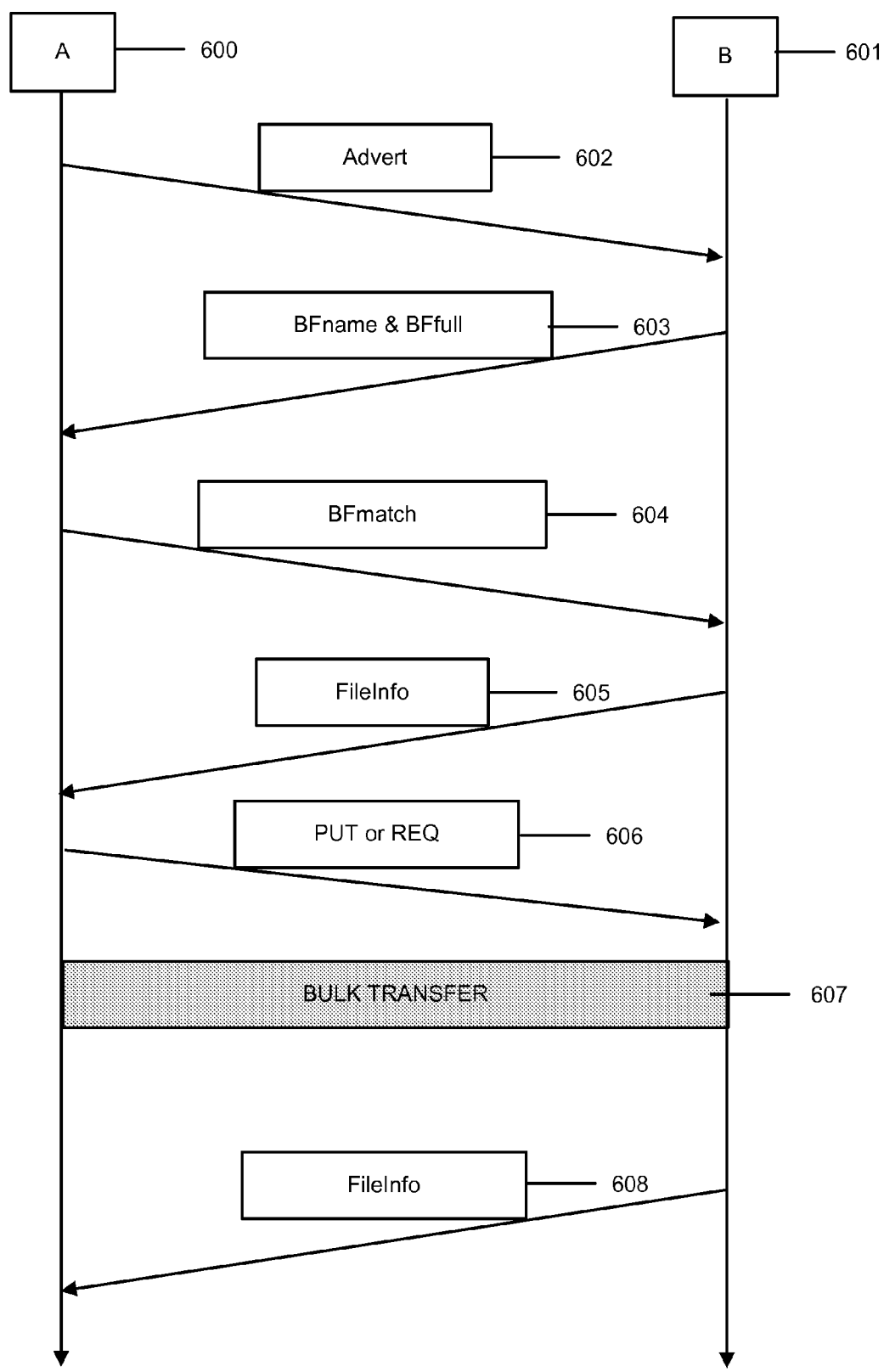
FIG. 6 is a message sequence chart of a message exchange between nodes in a content discovery process.

Node B creates and sends the first and second data structures to node A in message 603 (see FIG. 6). In an example, this message is a full frame (or packet) comprising two partial Bloom filters both using half of the available bits. The first partial Bloom filter is generated from the file identifiers of B's first 500 local files. The second partial Bloom filter is generated from the instance identifiers of B's first 500 local files.

Figure 5:
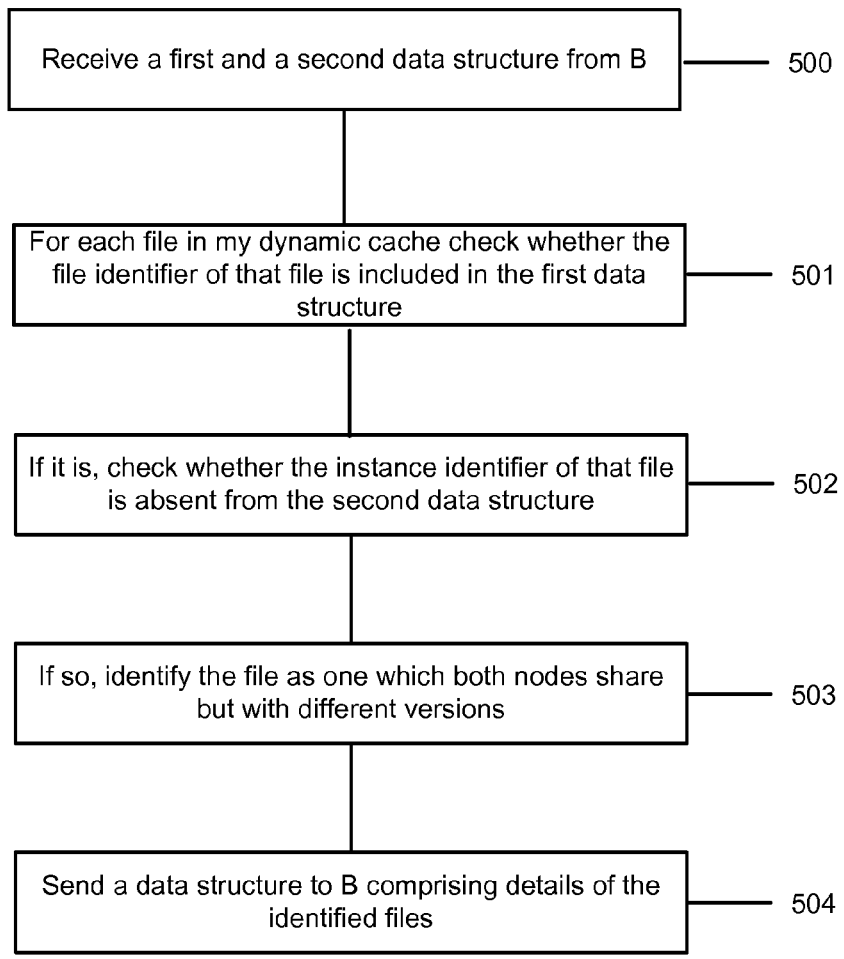
FIG. 5 is a block diagram of a method at a communications node as another part of a content discovery process for files in a dynamic cache.

Device A receives the first data structure and the second data structure from B and proceeds to make the checks as described at blocks 501 and 502 of FIG. 5. With reference to FIG. 5, node A receives the first and second data structures from node B (block 500). For each file in its dynamic cache, node A checks whether the file identifier of that file is included in the first data structure (block 501). If so, a check is made as to whether the instance identifier of that file is absent from the second data structure (block 502). If so, the file is selected as one which both nodes share (except in the case of a false positive) but with different versions (block 503). In that case, a data structure is sent to B comprising details of the selected files (block 504). A then responds to B by sending a full frame sized, partial bloom filter (message 604) formed from the file identifiers of all files in A that are represented in the first data structure received from B but which is it believed are not represented in the second data structure received from B. The full frame sized partial Bloom filter is sent by A to B.

B receives the full frame sized partial Bloom filter from A and compares the cache of files present on B to determine which of those files are represented in the full frame size partial Bloom filter. For each such file, B sends (605) a file information record containing B's file version and other file information upon which A decides whether to push or pull that file to or from B (message 606). A bulk content transfer process ensues 607 and the process repeats for the next identified file 608.

Figure 4:
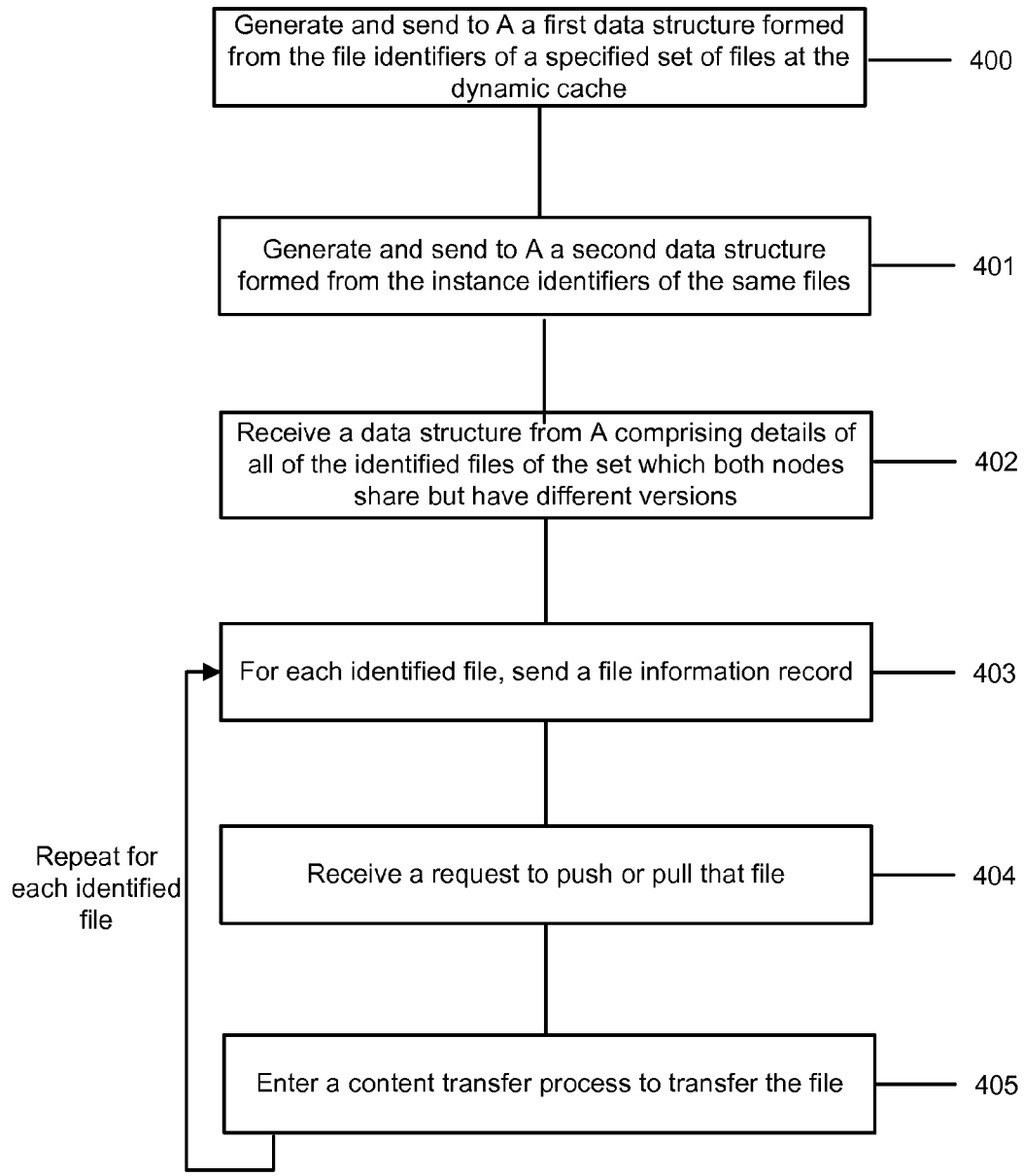
FIG. 4 is a block diagram of a method at a communications node as part of a content discovery process for files in a dynamic cache.

Referring to FIG. 4 again, node B receives a data structure from node A comprising details of all the identified files of the set which both nodes share but with different versions (block 402). Node B, for each identified file, sends a file information record to node A (block 403) and receives a request from A to push or pull that file (block 404). A content transfer process is then entered to transfer the file (block 405) and this process is repeated for each identified file as illustrated in FIG. 4. Any suitable content transfer process may be used.

file identifierinstance identifierThe methods of FIGS. 4 and 5 are summarized in FIG. 6 which represents nodes A 600, and B 601 and messages sent between those nodes. The direction of the arrows indicates the direction in which the messages are sent and the relative position of the arrows on the page indicates the sequence of the messages in time.

Various modifications may be made to the methods. For example, the partial Bloom filters may be formed from a any suitable pre-specified number of local files selected at random or in any other suitable way. In another example, instead of using two partial Bloom filters, a single Bloom filter is used to encode the data for both the first and second data structures. That is, the first and second data structures may be integral.

In a particular example, each file i in a dynamic cache $d_d$ has a file name $fname_i$ and a 16-bit version $version_i$ as well as the public key $pk_i$ of its owner associated with it. Using the SHA-1 hash function H, a node generates for each file i in $d_d$ two unique 160-bit identifiers:

File Identifier$_i$=$H$(concat(fname$_i$,pk$_i$)) and

Instance identifier$_i$=$H$(concat(fname$_j$,pk$_i$,version$_i$)).

A single 160-bit hash key that represents the entire content of $d_d$ is generated: Global Identifier=H(concat(InstanceIdentifier$_1$, Instance Identifier$_2$, . . . , Instance Identifier$_n$)) for all n files in $d_d$ ordered on File identifier. In another embodiment the global identifier may be generated using hash chaining. The Global Identifier is generated using a consistent ordering so that two nodes with the same files and versions have the same global identifier. Any suitable ordering may be used provided it is used consistently. Each device embeds its Global Identifier in its periodic adverts. Any device can thus compare its 160-bit Global Identifier with that of another device (whose advert it has just heard), and quickly determine if the devices have the same or different content files. As a Global Identifier only takes up 20 bytes, periodic adverts remain small.

Each node in the communications network may also hold fixed content files in a fixed content cache. Fixed content is expected to be present on all nodes and examples of fixed content may be operating system files.

Figure 7:
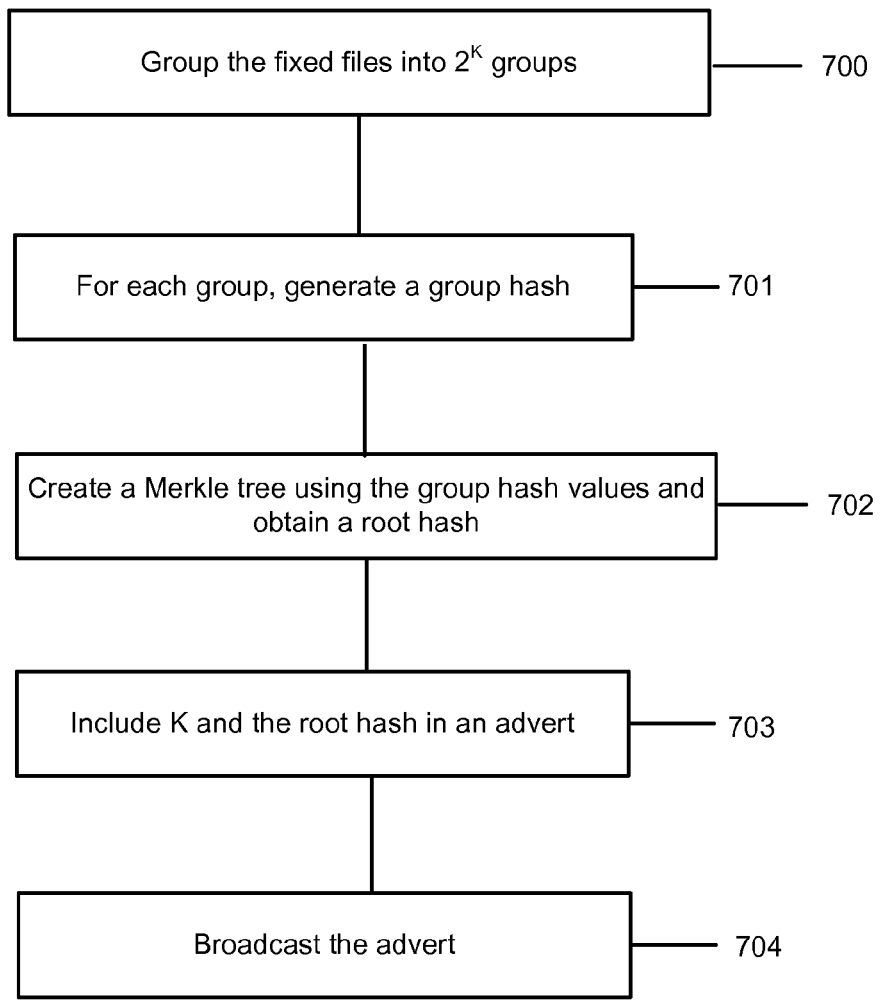
FIG. 7 is a block diagram of a method as part of a content discovery process for files in a fixed cache.

An example of a process for fixed content discovery is now described with reference to FIG. 7. Each node generates information for embedding in a advert and broadcasts this advert as now described. The node groups its fixed files into $2^k$ groups (block 700). For example, for each fixed file, the k-bit prefix of the file identifier (as described above with reference to FIG. 2) is taken. This file identifier may be the hash of the content providers public key and the textual name of the file. All the files having the same prefix are put into a group. The value of k may be selected such that each group has on average m files, for example m=16, k=4. This yields $2^k$ groups, represented as $g_0$ to $g_{2k}$. The file identifier is used so that the files are grouped independently of their version.

For each group a group hash is generated automatically by a processor on the node (block 701). For each file an instance identifier is created by taking a hash of the file certificate. The files in each group are then ranked using their instance identifier value and a group hash is generated by hash chaining. That is, each instance identifier is recursively hashed e.g. H(IdFile4, H(IdFile3, H(IdFile2, H(IdFile1)))). Where H represents a hash function.

A Merkle tree is then created automatically using a processor at the node (block 702). Merkle-trees are described in detail in R. Merkle. A digital signature based on a conventional encryption function. In Crypto' 87, 1987. Each row of the Merkle tree is generated by taking pairs from the previous row and hashing them together. The group hash values are the leaves of the tree and are ranked according to their k-bit prefix. For empty groups, a null token is used. The root of the Merkle tree is a unique hash for the entire fixed file set, parameterized by the value of k used. Any node can determine if their fixed sets are identical by comparing the root hash for the same value of k. If the root hashes differ then the nodes have different content. The root hash and the value of k is included in a beacon (block 703) and broadcast (block 704).

If a node detects that its root hash differs from another nodes' root hash it carries out a recursive process to determine which files are different in the fixed caches at the two nodes. This is now described with reference to FIG. 8.

Node A 800 broadcasts an advert 802 which is received by node B 801. A processor at node B 801 automatically checks whether the root hash in the advert is different from node B's local root hash (block 803). If so, the processor at node B selects a $j^{th}$ level of node B's Merkle tree and sends that to node A in a packet 804. The $j^{th}$ level is selected based on the payload size of the packets being used by the communications protocol. For example, the $j^{th}$ level of the Merkle tree is selected such that $2^j*20$<payload size. At node A a processor automatically checks 805 which hashes in the $j^{th}$ level of its local Merkle tree differ from those received in the packet 804. For those differing hashes node A sends an associated sub-tree level of its local Merkle tree to node B using packet 806. Node B then checks which hashes at that sub-tree level of its local Merkle tree differ from those received in packet 806. It selects an associated sub-tree level of its local Markle tree based on those differing hashes and sends that sub-tree level back to Node A using packet 808. This process repeats until the full hashes for the set of groups that may differ can be fitted into a packet. In some embodiments, two groups fit into a single packet thereby keeping the number of packets required low, and this influences the choice of the value of m.

This provides a very efficient algorithm that efficiently allows a node to detect a differing file with low overhead. For example, in an implementation which uses a payload size of 2304 bytes, it is possible to fit 115 hashes in a single packet. In this case, the likelihood that groups have more than 57 files is low when m=16. (When m=16 the probability of a single group having 56 entries or more is $10^{-15}$. Only one level of the Merkle tree needs to be exchanges in this case in order to discover a file that is different, where that the number of files in the fixed set is less than approximately 3650. Thus the process is able to efficiently identify a differing file rapidly, in a few messages.

It is possible to add and remove files from the fixed file cache. The addition of a file impacts a single group and the file is mapped into a single group. A permanent record may be kept of deleted files. The grouping of the files makes it possible to efficiently determine which groups are required in the event that one or more files are added or removed. For example, the grouping is such that a single group is impacted when a file is added. Then, if two files are added, each in a different group, it is possible to efficiently determine which two groups have been impacted. It is not necessary to repeat the content discovery process after the first differing file has been found.

Once a differing file in the fixed file cache has been detected using the methods described above any suitable content transfer process may be used to transfer that file between the two nodes. For example, TCP over IP may be used or any other suitable packet-based content transfer process.

Figure 8:
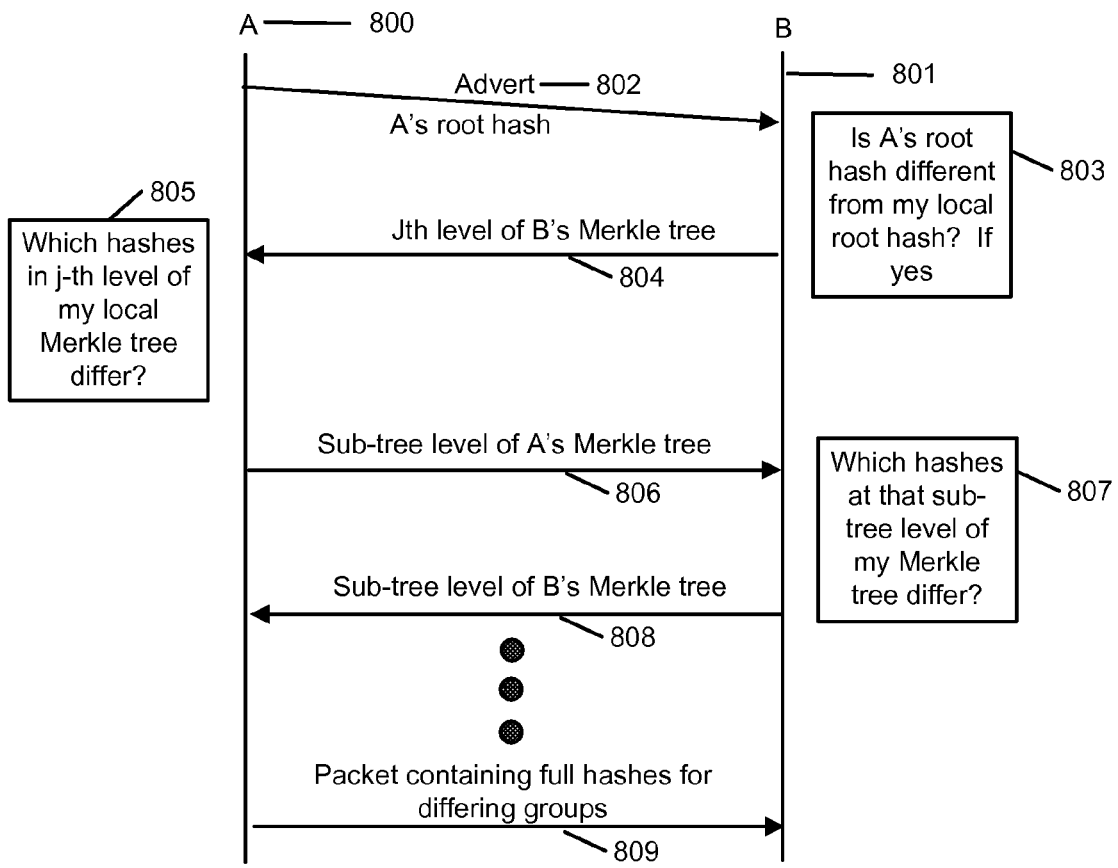
FIG. 8 is a message sequence chart of a message exchange between nodes in a content discovery process.

In some embodiments the content transfer process used in conjunction with the methods described herein is as now described with reference to FIGS. 9 and 10. This content transfer process exploits the ability of each node to know in advance the size of the file to be transferred. For example, in the process of FIG. 6 the file size information is known to the node which currently has that file and is sent to the other node as part of the file information record (message 605 of FIG. 6). In the process of FIG. 8 the node to receive the latest version of an identified file either requests the file size information from the other node or is automatically sent that information.

Figure 9:
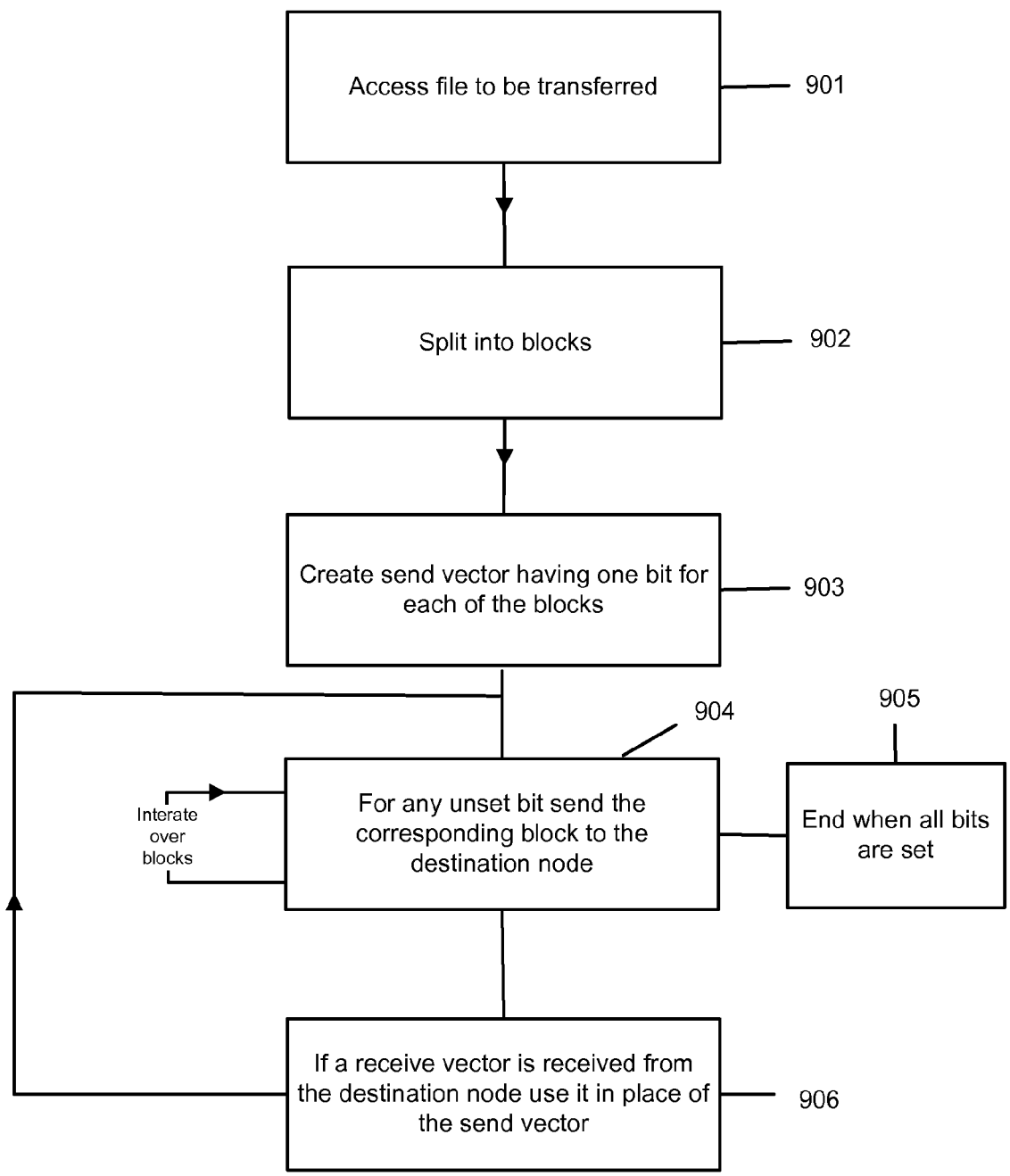
FIG. 9 is a block diagram of a method at a node for content transfer.

FIG. 9 is a block diagram of a method at a source node in a communications network. The source node may be any of the communications nodes of FIG. 1 and it may also operate as a destination node.

The source node has an input which accesses (block 901) a file or other piece of content to be transferred to a destination node. The source node comprises a processor of any suitable type which is arranged to split the file or other piece of content into blocks (see block 902) where a block has a pre-specified size. The processor creates a send vector having one bit for each of the blocks (see block 903) and this vector is initialized, for example, so that each bit has the value zero.

When the send vector is initialized all the bits in that vector are considered to be unset. A process of sending blocks to the destination node then occurs (see block 904 of FIG. 9). For any unset bit in the send vector the processor is arranged to send the block corresponding to that unset bit to the destination node. This process iterates over the blocks and ends when all the bits in the send vector are set (block 905). During this process, if a receive vector is received from the destination node (block 906) that receive vector is used in place of the send vector. The receive vector is described in more detail below with reference to FIG. 10. When the blocks are sent they may be formed into packets, for example, with one or more blocks forming the payload of a packet and the packet having a header comprising control information such as details of the source node and destination node.

Figure 10:
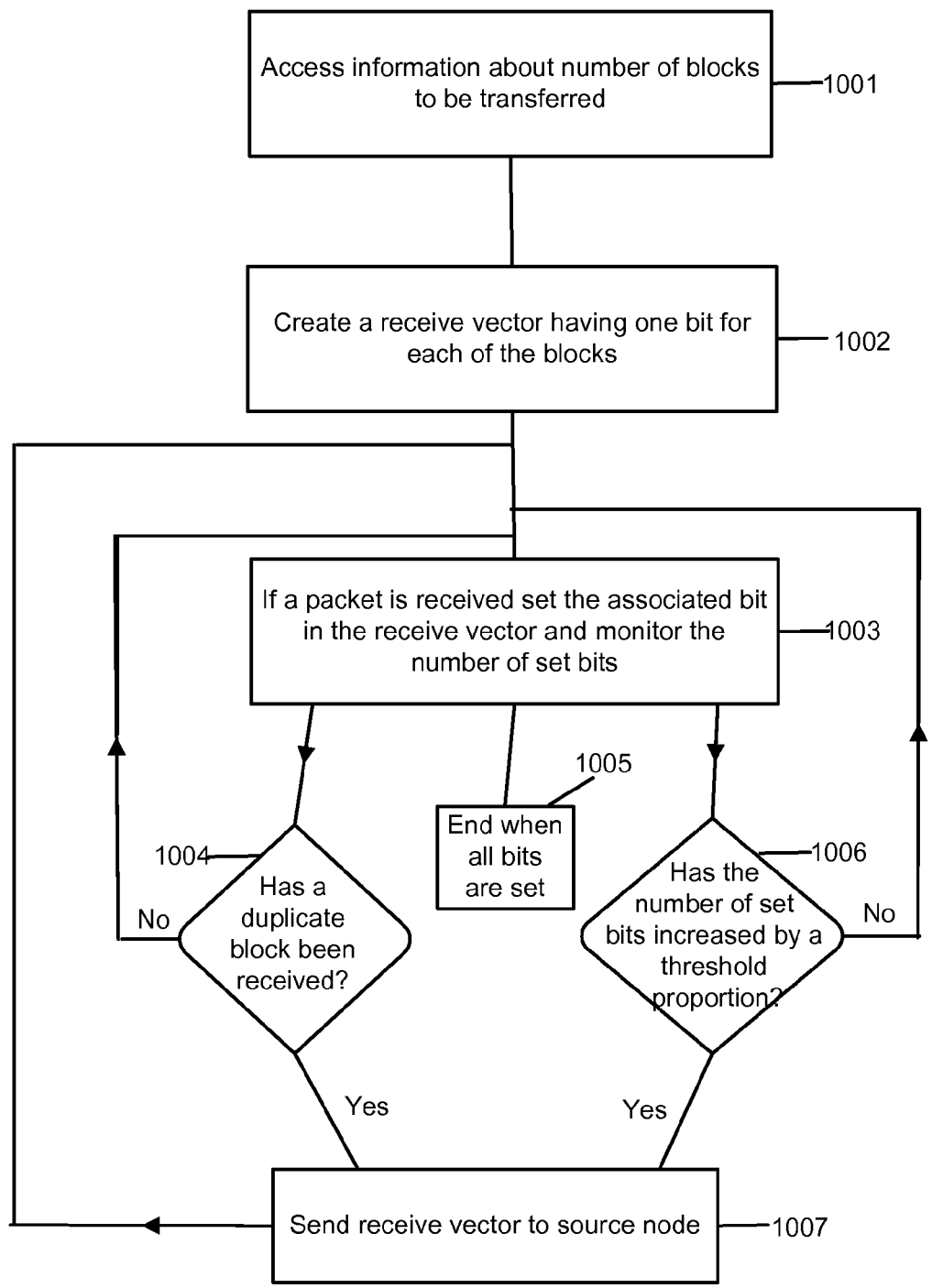
FIG. 10 is a block diagram of a method at another node for content transfer.

FIG. 10 is a block diagram of a method at a destination node. The destination node accesses information about the number of blocks of data to be transferred (block 1001 of FIG. 10). This information is obtained in any suitable manner. For example, a connection between the source and destination node may already be established and the source node may provide this information to the destination node. The destination node comprises a processor which is arranged to create a receive vector having one bit for each of the blocks to be transferred (1002 of FIG. 10). The receive vector is initialized so that each of the bits is considered to be unset.

A connection between the source node and the destination node is already established as mentioned above and the destination node monitors that connection for packets. If a block is received, the processor at the destination node is arranged to set the associated bit in the receive vector and monitor the number of set bits in that vector (block 1003 of FIG. 10).

If the number of set bits has increased by a threshold proportion (block 1006 of FIG. 10) then the destination node sends its receive vector to the source node (block 1007 of FIG. 10). The threshold proportion may be 50% or any other suitable threshold. Also, the processor is optionally arranged to send the receive vector to the source node if a duplicate block is received at the destination node (blocks 1004 and 1007 of FIG. 10). When all the bits in the receive vector are set the process ends (block 1005).

By using the receive vectors as described herein the number of acknowledgement packets that need to be sent is low. The acknowledgement packets here are those sending the receive vector. This improves efficiency and reduces pressure on communications network resources. For example, the destination node does not need to send a copy of the receive vector every n packets. It is able to send a copy of its receive bit vector based on a function of the received packets. For example, whenever the destination node sends the receive vector it is able to record the number of set bits. When the number of set bits increases by 50% (or other suitable threshold proportion) this triggers a sending of the receive vector. Also, if the destination node gets a predefined number of duplicate packets, for example, one, it triggers the sending of the receive vector. In this way the protocol generates $O(\log k)$ packets containing receive vector information (where k is the number of packets required to transfer a file). For example, to transfer a 1 MB file over a link with a 30% loss rate the number of receive vector packets sent is less than 1% of the total number of packets needed to complete the transfer. In addition, the number of duplicate packets received at the destination node will be close to zero. Also, if a file transfer is interrupted and needs to be resumed with either the same or different communications network node, the destination node is able to provide the receive vector and the transfer process starts from that point.

It is also noted that, if the connection between the source node and destination node has a high loss rate and this leads to a packet containing the receive vector being dropped, then recovery is quick. This is because another packet containing the receive vector will shortly be sent. As a result the process is robust.

The receive vector is typically of a size which is able to fit into a single packet. Where a very large file is to be transferred from the source node to the destination node it may not be possible to fit the receive vector into a single packet. In this case it is possible for the source node to decompose or split the file into one or more parts and send each of those separately using the processes described herein. Once all the parts are received the destination node can reconstruct the original large file.

In another embodiment now described with reference to FIG. 5 the source node and the destination node are mobile communications devices having wireless network interface controllers for connecting to one another. The nodes have limited computational power. The source and destination nodes may directly interface to one another in an ad hoc mode using communications protocols based on those defined in the IEEE 802.11 family of standards (as represented by arrow 503 in FIG. 5). In this embodiment the communications link between the source and destination node is short lived and lossy. For example, the source and destination nodes are integral with satellite navigation devices 501 in moving vehicles 500.

For example, in this embodiment the nodes comprise satellite-navigation devices with integral wireless network interface controllers. The nodes are arranged to carry out content discovery for files in a dynamic cache at each node using the methods of FIGS. 2 to 6 as described above. The nodes are arranged to carry out content transfer using any suitable protocol such as TCP over IP or using the process described above with reference to FIGS. 9 and 10. In the case that the process described above with reference to FIGS. 9 and 10 is used it is not necessary to use IP. Instead nodes may be identified using their MAC addresses incorporated in a header in all packets. In this way it is not necessary to detect and manage duplicate IP address or to use address resolution protocol (ARP). Also, the full frame size that the wireless network interface controller can support may be exploited. This reduces the overhead per packet and allows a higher goodput to be achieved.

In an evaluation a number of experiments were run on a small vehicular testbed, consisting of two cars. For all the experiments a laptop running Windows® XP SP2 with a Netgear (trademark) WAG511 PCMCIA card, which uses the Atheros (trademark) ar5212 chipset, was installed in each vehicle. Two possible configurations for the 802.11 antenna were calculated: in the baseline case the laptop was placed on the rear parcel shelf, consistent with the height that a portable SatNav device would be mounted. In the second case, the antenna was placed external to the car by mounting a laptop on the roof of each car. In order to minimize interference from other wireless networks deployed in homes 802.11a was used which operates on the 5.4 GHz band. Additionally, both laptops were equipped with a GPS receiver to record their respective location and velocity. In the experiments each laptop was configured to use the Atheros (trademark) Reference Driver, modified to ensure rapid link-level discovery. For each experiment, both laptops had the same 50 file entries in their $d_d$. One of the laptops had a later version of each file, with each file 10 MB in size. When the two devices become connected, they determine the set of files to transfer, using the content discovery algorithms described earlier. In order to transfer the file, two configurations are considered: TCP and Broadside. TCP: In this configuration, the standard unmodified Windows® XP SP2 TCP/IP stack is used, and files are transferred using TCP configured with the standard MTU of 1500 bytes. In order to remove the overheads of assigning IP addresses to the laptops dynamically, we statically configured each with a non-conflicting IP address. Broadside: In this configuration, the TCP/IP stack is disabled and the data transfer protocol described with reference to FIGS. 9 and 10 is used. This means no IP address need be assigned to each laptop, and the data transfer is configured to use the maximum frame size of 2304 bytes. The experiments were run on streets in Cambridge, UK. In order to increase confidence in the results, all experiments ran on the same day, running each experiment 5 times, back-to-back, attempting to ensure that all experiments were run at the same vehicle velocities. In the interest of repeatability only one moving car was used in our experiments and the second car parked by the road side. The moving car acted as the data source throughout, transmitting to the stationary car. For each experiment 5 runs are obtained. The duration of each run differs, so for each the achieved goodput is normalized by the duration of the connectivity between the laptops, to provide to goodput in bytes per second. The 5 runs are ranked based on this goodput metric, and the run which achieved the median value selected to then cross-compare. The location is close to central Cambridge but, due to a local traffic calming scheme, has only a modest amount of through traffic. The area is densely populated with buildings typical of $19^{th}$ century town-center development in Europe, with characteristically narrow roads lined with two-story terraced houses. With a continuous row of packed cars along one or both kerbs, there is insufficient room for two cards to pass in opposite directions, and a one-way traffic system is enforced together with speed-bumps. This limited the speed of our car to between 10 and 15 miles per hour at the point of closest approach. The results show that TCP achieves reasonable goodput, of nearly 1 MB/sec, both with an internal and external antenna. Broadside outperforms TCP by a factor of 1.61 using an internal antenna, and by a factor or 1.85 with an external antenna. The connection time and total bytes of goodput are shown in the table below.

|  | Time | Goodput |
| --- | --- | --- |
| TCP internal | 15.594 | 15,294,708 |
| Broadside internal | 13.797 | 21,915,440 |
| TCP external | 28.172 | 25,731,072 |
| Broadside external | 26.765 | 45,301,480 |

Figure 11:
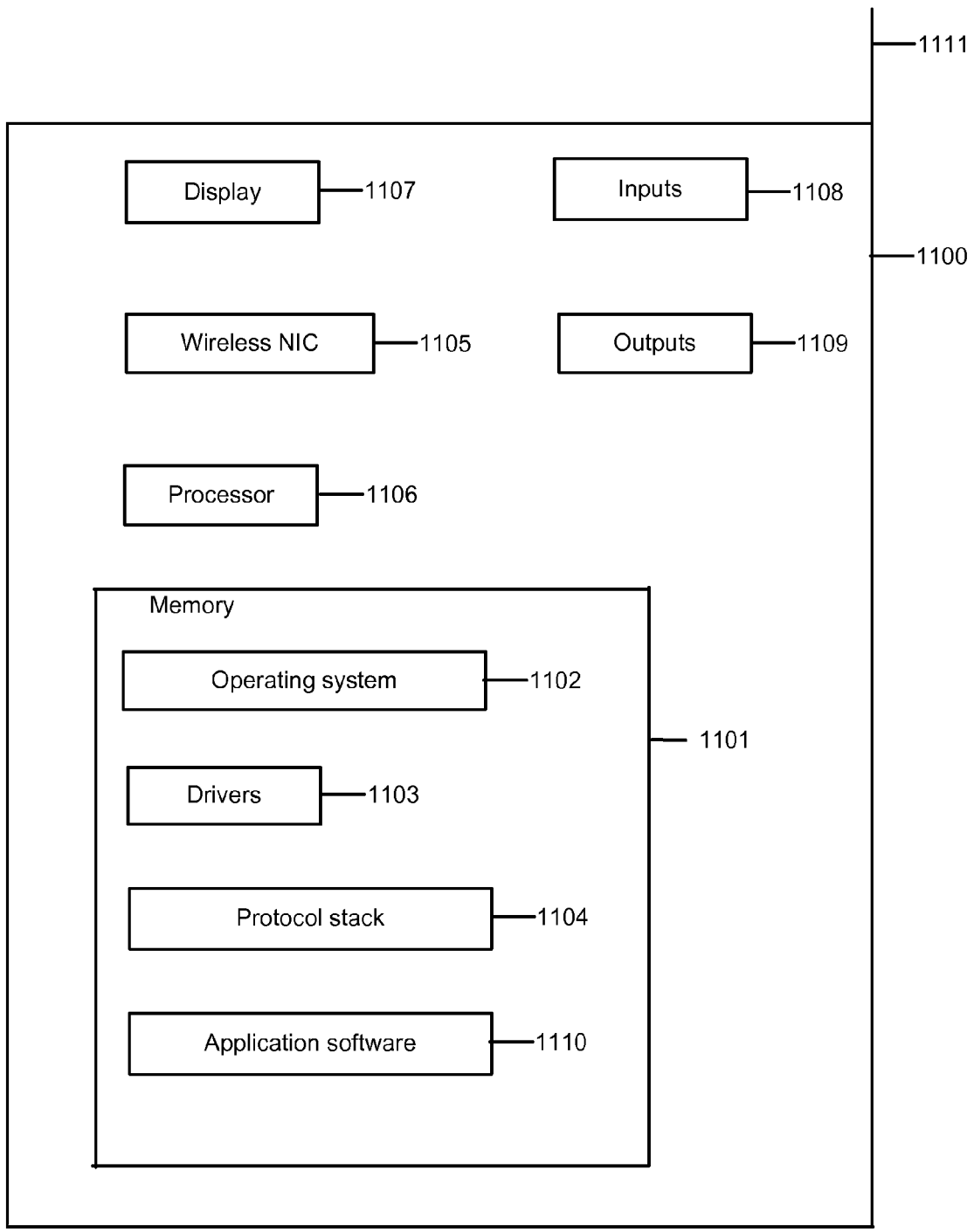
FIG. 11 illustrates an exemplary computing-based device in which embodiments of a communications network node may be implemented.

FIG. 11 illustrates various components of an exemplary computing-based device 1100 which may be implemented as any form of a computing and/or electronic device, and in which embodiments of any of the communications nodes described herein may be implemented. For example, the device 1100 may be a PDA, Laptop computer, Satellite navigation device for use in a vehicle or other suitable computing-based device.

The computing-based device 1100 comprises one or more inputs 1108 which are of any suitable type for receiving media content, Internet Protocol (IP) input, or other input. The device also comprises a wireless antenna 1111 and a wireless network interface controller 1105.

Computing-based device 1100 also comprises one or more processors 1106 which may be microprocessors, controllers or any other suitable type of processors for processing computing executable instructions to control the operation of the device in order to communicate with another node, discover content at that node and transfer content with that node. Platform software comprising an operating system 1102 or any other suitable platform software may be provided at the computing-based device to enable application software 1110 to be executed on the device.

The computer executable instructions may be provided using any computer-readable media, such as memory 1101. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1109 is also provided such as an audio and/or video output to a display 1107 integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising: at a mobile communications network node of a mobile communications network having a first memory storing a plurality of files that it is required to synchronize with at least one other communications network node in the mobile communications network based upon a proximity of the mobile communications network node to the other communications network node;
automatically generating and sending to the other communications network node a packet comprising a first data structure, that first data structure being formed using file names and public keys of the plurality of files;
automatically generating and sending to the other communications network node a second data structure formed using the file names, the public keys and version numbers of the plurality of files; and
receiving from the other communications network node a packet comprising a data structure having details of any identified files of the plurality of files which are present in a second memory at the other communications network node with different version numbers.

2. A method as claimed in claim 1, wherein the first and second data structures are both sent in the packet.

3. A method as claimed in claim 1, wherein the data structures are based on Bloom filters.

4. A method as claimed in claim 1, wherein the first and second data structures are formed using information about only a partial number of the plurality of files.

5. A method as claimed in claim 1, which further comprising carrying out a content transfer process to synchronize each of the identified files with the other communications network node.

6. A method as claimed in claim 1, further comprising receiving a broadcast advert from the other communications network node, that broadcast advert being a packet comprising a first .global identifier and deciding whether to proceed with the sending of the first and second data structures on the basis of a comparison of the first global identifier with a second .global identifier of the communications network node.

7. A method as claimed in claim 6, wherein each of the first and second global identifiers formed using a file identifier and an instance identifier for each file in memory, the file identifier being formed using the file name and the public key for each file, and the instance identifier being formed using the file name, the public key and the version number for each file.

8. A method as claimed in claim 6, wherein the broadcast advert also comprises a total number of files in the second memory at the other communications network node.

9. A method as claimed in claim 8, which further comprises comparing the number of the plurality of files with the total number of files in the broadcast advert.

10. A method as claimed in claim 5, wherein the proximity location is within a communication range that allows wireless communication between the mobile communication network node and the other communications network node, and the content transfer process that synchronizes each of the identified files is triggered when the mobile communications network node enters the communication range with the other communications network node.

11. A method as claimed in claim 10, wherein the mobile communications network node and the other communications network node are in a joined state within the communication range as long as beacons are communicated between them.

12. A method as claimed in claim 11, further comprising:
transitioning the mobile communication network node from the joined state to a quiet state when communication with the other communications network node is terminated;
and performing active scanning to discover further communications network nodes in a content distribution cloud.

13. A method as claimed in claim 1, wherein the plurality of files include content relating to at least one of images, lists, maps, navigation data, road construction locations, safety camera locations, landmark locations, and/or points of interest locations.

14. A method as claimed in claim 6, wherein the broadcast advert announces the presence of the other communications node.

15. One or more computer-readable non-transitory storage media comprising computer-executable instructions configured to implement the method as claimed in claim 1.

16. A method comprising:
at a mobile destination network node of a mobile communications network having a first memory storing a plurality of files;
receiving an advert from a source network node upon entering a communication range with the source network node;
automatically generating a first data structure formed using file names and public keys of the plurality of files;
automatically generating a second data structure formed using the file names, the public keys and version numbers of the plurality of files;
sending the first data structure and the second data structure to the source network node in a first packet; and
receiving, from the source network node, a second packet comprising a data structure having details of any identified files of the plurality of files which are present in a second memory at the source network node with different version numbers compared to the version numbers of the plurality of files present in the first memory.

17. A method as claimed in claim 16, further comprising synchronizing each of the identified files after the mobile destination network node enters the communication range with the source network node.

18. A method as claimed in claim 16, wherein the plurality of files include content relating to at least one of images, lists, maps, navigation data, road construction locations, safety camera locations, landmark locations, and/or points of interest locations.

19. A method comprising:
- at a source network node of a mobile communications network having a first memory storing a plurality of files;
- broadcasting an advert announcing a presence of the source network node;
- receiving, from a mobile destination network node at a proximity location within a wireless communication range, a packet including:
  - a first data structure including file identifiers of mobile destination network node files stored in a second memory on the mobile destination network node, the file identifiers being based on file names and public keys of each of the mobile destination network node files; and
  - a second data structure including instance identifiers of the mobile destination network node files, the instance identifiers being based on the file names, the public keys, and version numbers of each of the mobile destination network node files; using the packet received, identifying a subset of the plurality of files which both the mobile destination network node and the source network node share, but for which the version numbers are different.

20. A method as claimed in claim 19, wherein the identifying further includes:
- checking whether the mobile destination network node file identifiers match file identifiers associated with the plurality of files stored in the first memory; and
- when a match is found, checking whether a source network node instance identifier is absent from the second data structure received from the mobile destination network node to identify the subset of the plurality of files.

* * * * *

UNITED STATES PATENT AND TRADEMARK OFFICE
CERTIFICATE OF CORRECTION

PATENT NO. : 8,103,718 B2
APPLICATION NO. : 12/183460
DATED : January 24, 2012
INVENTOR(S) : Gregory Francis O'Shea et al.

Page 1 of 1

It is certified that error appears in the above-identified patent and that said Letters Patent is hereby corrected as shown below:

At column 16, lines 43-44, change "One or more computer-readable non-transitory storage media comprising" to -- One or more computer memories comprising --.

Signed and Sealed this
Seventh Day of August, 2012

David J. Kappos
*Director of the United States Patent and Trademark Office*